United States Patent [19]

Sayles

[11] Patent Number: 4,515,912

[45] Date of Patent: May 7, 1985

[54] CURE SHRINK-RESISTANT MISSILE MOTOR CASES

[75] Inventor: David C. Sayles, Huntsville, Ala.

[73] Assignee: The United States of America as represented by the Secretary of the Army, Washington, D.C.

[21] Appl. No.: 628,001

[22] Filed: Jul. 5, 1984

[51] Int. Cl.$^3$ .................... F42B 1/00; C09B 5/06; C06B 45/10; C08K 5/15
[52] U.S. Cl. ........................ 523/456; 149/2; 523/138; 523/180; 523/427
[58] Field of Search ............ 523/138, 180, 427, 456; 149/2

[56] References Cited

U.S. PATENT DOCUMENTS 3,882,784  5/1975  Nauflett et al. .................. 149/19.6
3,947,523  3/1976  Schaffling .......................... 149/97
4,304,185  12/1981  Sayles ................................ 149/2
4,441,942  4/1984  Sayles ............................ 149/19.6

OTHER PUBLICATIONS

Chem. Abstr. 67, 54117v (1967).
Chem. Abstr. 63, 11732h (1965).
Chem. Abstr. 65, 4052g (1966).
Chem. Abstr. 72, 56094n (1970).
Bodenbenner, K., Justus Liebig Ann. Chem., 623, 183 (1959).
Bailey, W. J. et al., Journal of Poly. Sc:Poly. Chem. Ed., vol. 14, pp. 1735–1741, (1976).

*Primary Examiner*—Ronald W. Griffin
*Attorney, Agent, or Firm*—Anthony T. Lane; Robert P. Gibson; Jack W. Voigt

[57] ABSTRACT

Cure shrink-resistant missile motor cases are disclosed along with their method for construction. These cases comprise a matrix resin composition which includes a bisspiroortho carbonate as a fourth component, a curing agent of o-phenylenediamine boron trifluoride etherate as a third component, butanediol diglycidyl ether as a second component, and equal parts by weight of diglycidyl ether of bisphenol A and epoxidized dimer of oleic acid as a second component and additionally, they comprise, in combination therewith, a high strength fiber reinforcement material selected from the group consisting of fibers of glass, graphite, and poly-p-ethylene terephthalamide (Kevlar). The specific bisspiroortho carbonate which achieves an expansion of the matrix resin on polymerization or curing is 3,9-bis(5'-norbornene-2'-yl)-1,5,7,11-tetraoxaspiro [5.5]undecane. The expansion on curing prevents or decreases the inherent stress build-up in a fiber coated and filament wound composite motor case which is normally encountered when a standard matrix resin shrinks on polymerization or curing. A typical, standard resin includes the first two components and TONOX 60/40 which is a mixture comprised of 65% 4,4'-diaminodiphenylmethane, 10% triamines, and 25% polyamines.

4 Claims, 1 Drawing Figure

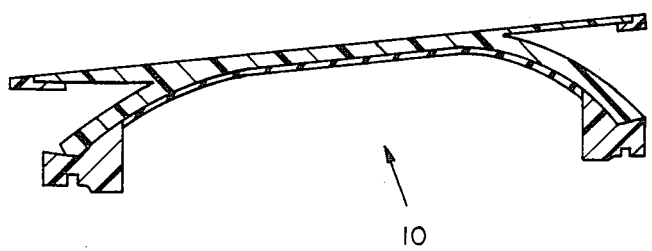

CURE SHRINK-RESISTANT MISSILE MOTOR CASES

DEDICATORY CLAUSE

The invention described herein may be manufactured, used, and licensed by or for the Government for governmental purposes without the payment to me of any royalties thereon.

BACKGROUND OF THE INVENTION

Filament-reinforced resin motor cases have been extensively used in the propulsion industry. Several advantages have resulted from employment of filament-reinforced resin motor cases. Some of the advantages include: light weight motor case, less insulation requirements for the filament-reinforced resin motor case, the ease of manufacture, storage, transportation, and stability against sparking or electrical conductance malfunctions.

Advanced interceptor motor case technology has placed additional requirements on the propulsion industry to ensure that these motor cases withstand the stresses due to high acceleration forces resulting from employing ultrahigh burning rate propellants and control systems which achieve high maneuverability to execute difficult tactical movements. It is well established that the strength of a motor case is weakened at points of stresses due to material weaknesses or fabrication techniques. For filament-reinforced composite motor cases, particularly, those that include a curable resin which undergo shrinkage on polymerization, stress due to shrinkage of the resin causes an inherent defect from the manufacture of the motor case.

An object of this invention is to provide a method of modifying the resin components which go into the manufacture of filament-reinforced composite motor cases wherein an elimination or reduction of shrinkage occurs during polymerization (or cure).

A further object of this invention is to provide a modification to the resin components which go into the manufacture of filament-reinforced composite motor cases wherein a bisspiroortho carbonate is incorporated into the epoxy resin blend to achieve an expansion during polymerization (or cure) of the modified epoxy resin blend to thereby prevent shrinkage and the stress due to the shrinkage normally encountered within the incorporated bisspiroortho carbonate which imparts an expansion during polymerization (or cure) of the modified epoxy resin blend.

SUMMARY OF THE INVENTION

The resin blend components which go into the manufacture of the filament-reinforced composite motor cases are modified by incorporating a bisspiroortho carbonate and a curing agent of o-phenylenediamine-boron trifluoride etherate into the resin blend that is used in the fabrication of filament-reinforced composite motor cases to impart an expansion during polymerization (or cure) to thereby prevent stress due to shrinkage while curing which causes an inherent defect in the epoxy resin blend of the filament-reinforced composite motor case.

The modified resin blend (in parts by weight) in addition to containing diglycidyl ether of bisphenol A (EPON 828) 50 parts, epoxidized dimer acid (EPON 871) 50 parts, and butanediol diglycidyl ether 25 parts, contains bisspiroortho carbonate 15 parts and o-phenylenediamine-boron trifluoride etherate 20 parts.

The filament-reinforced composite motor case containing AS-4 graphite-fiber-reinforced or 4560 Kevlar-reinforced case fabrication materials with the modified resin blend showed a higher burst pressure as compared to a control motor case designed to burst at a nominal pressure of 5400 psi). This burst pressure comparison indicates a lower degree of inherent stress resulting from curing of the modified resin blend during motor case processing.

BRIEF DESCRIPTION OF THE DRAWING

The single FIGURE of the drawing is a partial, cross-sectional drawing of a subscale test motor case.

DESCRIPTION OF THE PREFERRED EMBODIMENT

Modifying the resin components which go into the manufacture of filament-reinforced composite motor cases by adding a bisspiroortho carbonate and a curing agent of o-phenylenediamine-boron trifluoride etherate achieves an expansion during curing rather than a normal shrinkage which occurs during curing of a standard epoxy resin blend employed to coat the reinforcement filaments.

The epoxy resin blend that is modified in accordance with this invention is comprised of a first component mixture of diglycidyl ether of bisphenol A (EPON 828) 50 parts and epoxidized dimer acid (EPON 871) 50 parts; a second component of butanediol diglycidyl ether 25 parts; and a three component mixture of TONOX 60/40 (20 parts) which is comprised of 65% 4,4'-diaminodiphenylmethane, 10% triamines, and 25% polyamines. The TONOX 60/40 (20 parts) is replaced with 20 parts of a third component of the curative o-phenylenediamine-boron trifluoride etherate, and to the above parts of ingredients excluding TONOX 60/40 is added about 15 parts of a fourth component of the bisspiroortho carbonate, 3,9-bis(5'-norbornene-2'-yl)-1,5,7,11-tetraoxaspiro[5.5]-undecane. The modified resin is a resin which expands during curing rather than shrinks during curing whereby the inherent stress normally formed from shrinkage during curing is eliminated or substantially reduced.

Specific reference is made of the effect produced by the incorporation of a bisspiroortho carbonate into the epoxy resin blend that is used in the fabrication of filament-reinforced composite motor cases. The bisspiroortho carbonate has the chemical name of:

3,9-bis(5'-norbornene-2'-yl)-1,5,7,11-tetraoxaspiro[5.5]undecane. The synthesis of this chemical compound is depicted in Table I. The synthesis consists of the reaction of cyclopentene with acrolein to produce 5-norbornene-2-al. Reaction of 5-norbornene-2-al with formaldehyde results in the formation of 5-norbornene-2,2-dimethanol. Mild oxidation of the latter compound with dibutylstannic oxide yields the 3,9-bis(5'-norbornene-2'yl)-1,5,7,11-tetraoxaspiro[5.5]undecane.

TABLE I

Synthesis Procedure for
3,9-Bis(5'-norbornene-2'yl) = 1,5,7,11-tetraoxaspiro[5.5]undecane

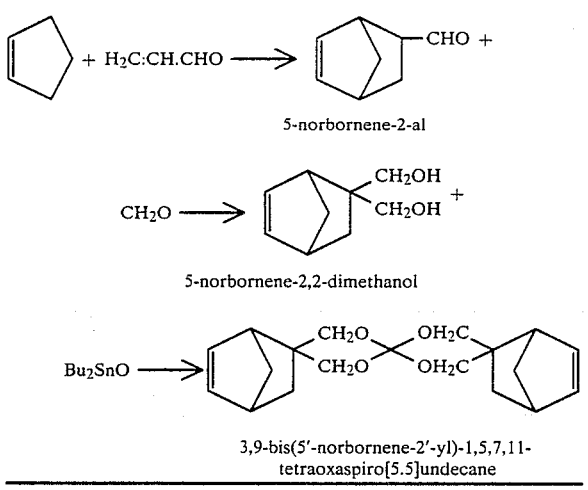

The detailed descriptive procedure for the synthesis of the 3,9-bis(5'-norbornene-2'-yl)-1,5,7,11-tetraoxaspiro[5.5]undecane is presented below:

3,9-bis(5'-norbornene-2'-yl)-1,5,7,11-textraoxaspiro[5.5]undecane

The Diels-Alder reaction of cyclopentadiene (33 g/0.5 mole) (obtained by pyrolysis of dicyclopentadiene) and acrolein (28 g/0.5 mole) is performed under gentle reflux in benzene (100 ml) for 7 hours. After the benzene is removed by evaporation at reduced pressure, the residue is distilled at reduced pressure to give 5-norbornene-2-carboxyaldehyde (56 g) (92%), bp 76°–77°/33 mm.

After a mixture of 5-norbornene-2-carboxyaldehyde (24.4 g/0.2 mole), methanol (100 ml), and 30% formalin (50 g) is heated at 70°–75° for 3 hours, potassium hydroxide (11.2 g) (35% aqueous solution) is added over a period of 1 hour to give 5-norbornene-2-2-dimethanol (21 g) (70%). This crude product is recrystallized from benzene to give a pure product, mp 110°.

A mixture of 5-norbornene-2,2-dimethanol (31 g/0.2 mole), dibutyl stannic oxide (50 g/0.2 mole), and toluene (400 ml) is charged into a 1-liter flask equipped with a Dean-Stark trap. The reaction is gently heated under reflux for about 10 hours to collect an almost theoretical amount of water which is produced during the reaction. After the reaction is cooled, carbon disulfide (16 g/0.21 mole) is added slowly to the mixture. The resulting mixture is again gently heated under reflux for about 10 hours. It is then cooled to precipitate the product, which is isolated by decanting off the toluene, and by extraction with a small portion of acetone. It is purified by two sublimations under reduced pressure to give: 3,9-bis(5'-norbornene-2'-yl)-1,5,7,11-tetraoxaspiro[5.5]undecane (15 g) (47%), mp 240°.

| Calcd. for $C_{19}H_{24}O_4$: | C = 72.15 |
|---|---|
| | H = 7.59 |
| Found: | C = 72.03 |
| | H = 7.50 |

The resin composition used in the fabrication of the composite test motor is presented in Table II, and the chemical structure formulas of Epon 828 and 871 are depicted in Table III.

TABLE II

Resin Composition Used in the Fabrication of the Composite Test Motor Cases

| Ingredient | Motor Case (Parts by Weight) | |
|---|---|---|
| | 1 | 2 |
| Bisphenol A-Epichlorohydrin* | 50 | 50 |
| Epoxidized Dimer Acid** | 50 | 50 |
| Butanediol Diglycidyl Ether | 25 | 25 |
| Bisspiroortho Carbonate*** | — | 15 |
| o-Phenylenediamine-Boron Trifluoride Etherate**** | — | 20 |
| TONOX 60/40***** | 20 | |

*Epon 828 (Chemical structure depicted in Table III)
**Epon 871 (Chemical structure depicted in Table III)
***3,9-Bis(5'-norbornene-2'-yl)-1,5,7,11-tetraoxaspiro[5.5]undecane
****Preparation of this complex is described below
*****A mixture consisting of:
65% 4,4'-diaminodiphenylmethane
10% triamines
25% polyamines

STRUCTURAL CHEMICAL FORMULAS OF EPON 828 EPON 871

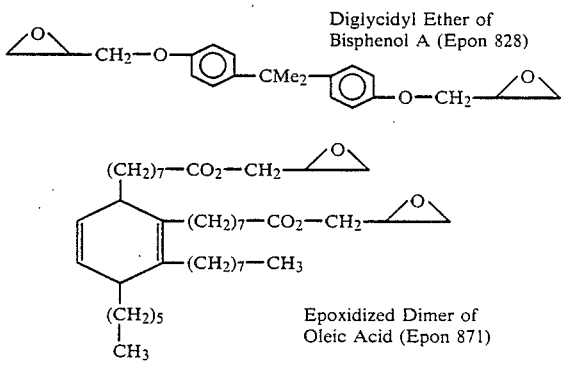

Diglycidyl Ether of Bisphenol A (Epon 828)

Epoxidized Dimer of Oleic Acid (Epon 871)

Preparation of o-Phenylenediamine-Boron Trifluoride Etherate Complex

To a stirred suspension of o-phenylenediamine (9.20 g., 85 mole) in dry ether (50 ml), boron trifluoride etherate (11.3 g., 85 mmole) is added dropwise. At first the mixture turned dark reddish brown, and then became a clear solution. After the stirring was continued for about 2 hours at room temperature, fine crystals precipitated. This precipitate was collected by filtration under suction, and washed with a small quantity of dry ether. The pale brown crystals were dried under reduced pressure. This compound was used as the curing agent without further purification.

A test motor case was specially designed for the comparative evaluation of the performance of AS-4 graphite-fiber-reinforced and 4560 Kevlar-reinforced fabrication materials. It was designed to burst at a nominal pressure of 5400 psi. A cross-sectional drawing of motor case 10 appears in the single FIGURE of the drawing. The baseline design was based on the use of graphite fiber, and it also served to establish the internal geometric configuration. A design summary of the filament-reinforced motor cases is provided in Table IV.

A step-by-step description of the fabrication procedure employed to wind the graphite-composite base and skirt is presented in Table V. The other motor case winding combinations are fabricated in a similar manner with practically no changes in the materials used.

The evaluation of the effects of the incorporation of the expandable bisspiroortho carbonate into the epoxy blend is carried out in the following manner. The subscale motor cases are loaded with a carpet-roll type of propellant charge (similar to the Light Assault Weapon, LAW) propellant. The aft port is then sealed; and the propellant charge is ignited by means of an igniter which is inserted into the foward polar opening. Using this design for the subscale test motor cases, the pressure developed in the motor case (as a result of propellant combustion) is retained within the case since the thickness of the web or total propellant charge can be precisely controlled to permit pressurization as a result of a predetermined burning times based on the amount of propellant charge. Both carpet-roll propellant and consolidated sheet propellant are well known and can be loaded into a test motor by several techniques such as, for example, are disclosed in U.S. Pat. No. 3,886,006 issued to Martin et al on May 27, 1975 and assigned to The United States of America as represented by the Secretary of the Army. The motor case is instrumented with several piezoelectric gages. The pressure reading obtained from the gages positioned on the conical section of the motor case when the case ruptures is used as the basis for comparison and for the determination of the superior design.

The tooling used in the fabrication of this test subscale motor case are as follows:
  a. Winding Mandrel—The winding mandrel used in the fabrication of this motor case is made from salt and a waterglass mixture. A chlorobutyl rubber liner of 0.031 in thickness overlaid in it can be derived from a geodesic dome contour computer program.
  b. Skirt Tooling—The graphite skirt tooling is employed to contruct the graphite-composite skirt by the winding sequence presented in Table VI.
  c. Materials—The materials used in the case fabrication are tabulated in Table VII.

The results which were obtained in the burst studies on the test motor cases are presented in Table VIII.

TABLE IV

Design Summaries of the Filament Reinforced Test Motor Cases

|  | Graphite-Composite Design | Kevlar Composite Design |
|---|---|---|
| 41° Winding | AS4 Graphite | 4560 Kevlar |
| 81½° Winding | AS4 Graphite | 4560 Kevlar |
| Layers (Aft Dome) | 6 | 6 |
| Layers (Aft Conical Section) | | |
| 81½° | 3 | 3 |
| 41° | 5 | 5 |
| Layers (Forward Conical Section) | | |
| 81½° | 3 | 3 |
| 41° | 4 | 4 |
| Layers (Forward Dome) | 4 | 4 |
| Band Widths | | |
| 41° | .152/Tow | .119/Roving |
| 81½° | .139/Tow | .110/Roving |
| Thicknesses | | |
| Aft Major Diameter (AMD) | .157 | .127 |
| Forward Tangent | .165 | .134 |
| Winding Angles | | |
| Aft Major Diameter | | |
| 1 | 41 | 41 |
| 2 | 81½ | 81½ |

TABLE IV-continued

Design Summaries of the Filament Reinforced Test Motor Cases

|  | Graphite-Composite Design | Kevlar Composite Design |
|---|---|---|
| Forward Tangent | | |
| 1 | 41 | 41 |
| 2 | 80.4 | 80.4 |

TABLE V

Fabrication Procedure for the Composite Test Motor Case

1. Weigh and record mandrel weight,
2. Assemble shaft and adapters, and install in machine with large end towards headstock,
3. Install rovings, and set tension of 5–6 lbs for graphite, and 2–3 lbs for Kevlar, as required,
4. Use teflon-covered cap plug with as little pressure as possible,
5. Mix resin,
6. Coat mandrel with resin mixture,
7. Wind one 41° helical using 1 roving and stop at aft end, (Pull back ¼-inch),
8. Apply a 0.010 brass shim (¾-inch wide) around unit so that it is centered 1⅜-inches forward from aft major diameter, and tape in place,
9. Wind a second 41° helical and tie off,
10. Part 2nd helical over the brass shim, and remove the forward half of the windings and shim,
11. Set up machine for 81½° winding,
12. Wind one 81½° helical using one roving overlapping forward tangent for ½-inch and aft tangent for ½-inch,
13. Set up machine for 41° winding,
14. Wind one 41° helical using 1 roving, and stop at aft end, (Pull back ¼-inch),
15. Apply a 0.010 brass shim (¾-inch wide) around unit centered ¼-inch forward from the aft major diameter, and tape in place,
16. Wind a second 41° helical, and tie off,
17. Part second helical over the brass shim, and remove the forward part of windings and shim, leaving the aft dome only covered.
18. Set up machine for 81½° winding,
19. Wind one 81½° helical using one roving overlapping forward tangent for ½-inch and aft major tangent for ¼-inch,
20. Set up machine for 41° winding,
21. Wind two 41° helicals using 1 roving,
22. Set up machine for 81½° winding,
23. Wind one 81½° helical using one roving overlapping the forward tangent and aft major line for ⅜-inch,
24. Wax the forward skirt mandrel, and assemble. (Use jack screws to adjust for perpendicularity of mandrel), adjust dam,
25. Install one ball of AS4 graphite tow, and set tension to 3–5 lbs,
26. Remove graphite mats from freezer, and allow to warm up for 1 hour prior to unsealing,
27. Set level wind advance to 0.167, and wind skirt,
28. Gel in machine until set up hard under heat. Carefully remove excess resin with gauze pads,
29. Cure for 3 hours at 120°±10° F.; following by 1 hour at 200°±10° F.; followed by 4 hours at 250° F.±10° F., 30. Remove tooling, wash out salt mandrel and clean up,
31. Machine skirt to length,
32. Hand sand the bond area of the forward skirt and the skirt ring,
33. Degrease with methylene chloride,
34. Mix 50 grams of Epon 828 and Epon 871 with 7¼ grams of TONOX 60/40 and bond the ring in place,
35. Allow the ring to cure at room temperature.

TABLE VI

Graphite-Composite Skirt Winding Sequence

| No. | Type Layer | Distance From Dam | Layer Width |
|-----|------------|-------------------|-------------|
| 1   | 90         | 0                 | .77         |
| 2   | 0          | 0                 | .77         |
| 3   | ±45        | 0                 | .77         |
| 4   | 90         | 0                 | 1.13        |
| 5   | 0          | 0                 | 1.30        |
| 6   | ±45        | 0.44              | 1.20        |
| 7   | 90         | 0.62              | 1.20        |
| 8   | 0          | 0.75              | 1.20        |
| 9   | ±45        | 0.89              | 1.20        |
| 10  | 90         | 1.07              | 1.05        |
| 11  | 0          | 1.27              | .88         |
| 12  | ±45        | 1.40              | .79         |
| 13  | 90         | 1.52              | .70         |
| 14  | 0          | 1.64              | .62         |
| 15  | ±45        | 1.76              | .56         |
| 16  | 90         | 1.92              | .42         |
| 17  | 90         | 2.05              | .34         |
| 18  | 90         | 2.18              | .28         |
| 19  | 90         | 2.31              | .20         |
| 20  | 90         | 0                 | 2.87        |

TABLE VII

Fabrication Materials Used in Test Motor Cases

| Body  | Fiber | | Design 1 | Design 2 |
|-------|-------|-|----------|----------|
| | Fiber | Hoops (81½°) | Graphite AS-4 .139 In/Tow | Kevlar 4560 Denier .110 In/Rov |
| | | Helicals 41° | Graphite AS-4 @ .152 In/Tow | Kevlar 4560 Denier .119 In/Rov |
| Skirts | Fiber | | Graphite AS4-12000 Filament Tow | |

TABLE VIII

Burst Test Results on Test Motor Cases w/wo the Expandable Resin Modifier

| Test Motor Cases | Control | | Burst Pressures (PSI) Modified | |
|---|---|---|---|---|
| *GR-001 | 6400 | Average Value = | 7200 | Average Value = |
| GR-002 | 6500 | | 7200 | |
| GR-003 | 6400 | 6433 | 7250 | 7217 |
| **KE-001 | 4500 | Average Value = | 5400 | Average Value = |
| KE-002 | 4550 | 4550 | 5700 | 5550 |
| KE-003 | 4600 | | 5550 | |

*Graphite-Composite
**Kevlar-Composite

The high strength filaments or tapes employed as reinforcement material in combination with the resin matrix composition can be selected from glass fibers, graphite, or Kevlar (poly-p-ethylene terephthalamide) fibers or film.

I claim:

1. A matrix resin composition comprising:
   a. about 100 parts by weight of a first component which is a two component mixture of approximately equal parts by weight of a diglycidyl ether of bisphenol A and an epoxidized dimer of oleic acid;
   b. about 25 parts by weight of a second component of butanediol diglycidyl ether;
   c. about 20 parts by weight of a third component of a curing agent of o-phenylenediamine-boron trifluoride etherate; and,
   d. about 15 parts by weight of a fourth component of the bisspiroortho carbonate 3,9-bis(5'-norbornene-2'-yl)-1,5,7,11-tetraoxaspiro[5.5]undecane, said bisspiroortho carbonate being an expandable component during polymerization or curing phase of said matrix resin composition which achieves a conversion of said first three components of said matrix resin composition from a shrinkable matrix resin composition to an expanded matrix resin composition during polymerization or curing phase of said matrix resin composition.

2. A composite structure fabricated from the matrix resin composition as defined in claim 1 and in combination therewith a high strength fiber material selected form the group consisting of fibers of glass, graphite and poly-p-ethylene terephthalamide.

3. The composite structure as defined in claim 2 wherein said high strength fiber is graphite and said structure is a rocket motor case.

4. The composite structure as defined in claim 2 wherein said high strength fiber is poly-p-ethylene terephthalamide and said structure is a rocket motor case.

* * * * *